United States Patent
Brown et al.

(10) Patent No.: US 10,728,816 B2
(45) Date of Patent: Jul. 28, 2020

(54) ASSISTED HANDOVER TO VOLTE IN CASE OF VOWIFI FAILURE

(71) Applicant: British Telecommunications Public Limited Company, London (GB)

(72) Inventors: Ruth Brown, London (GB); Alistair Gomez, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/065,906

(22) PCT Filed: Dec. 29, 2016

(86) PCT No.: PCT/EP2016/082894
§ 371 (c)(1),
(2) Date: Jun. 25, 2018

(87) PCT Pub. No.: WO2017/114932
PCT Pub. Date: Jul. 6, 2017

(65) Prior Publication Data
US 2019/0014519 A1 Jan. 10, 2019

(30) Foreign Application Priority Data
Dec. 31, 2015 (EP) .................................. 15203278

(51) Int. Cl.
*H04W 36/14* (2009.01)
*H04W 36/16* (2009.01)
(Continued)

(52) U.S. Cl.
CPC ........... *H04W 36/14* (2013.01); *H04W 36/16* (2013.01); *H04W 76/16* (2018.02); *H04W 24/04* (2013.01)

(58) Field of Classification Search
CPC ..... H04W 36/14; H04W 76/16; H04W 36/16; H04W 24/04; H04W 88/08; H04W 88/10; H04W 92/02
See application file for complete search history.

(56) References Cited

U.S. PATENT DOCUMENTS 8,805,374 B2 * 8/2014 Zhu ........................ H04W 36/36
455/436
9,420,510 B1 8/2016 Surmay et al.
(Continued)

FOREIGN PATENT DOCUMENTS

| CN | 105554855 | 5/2016 |
| EP | 2 900 016 A1 | 7/2015 |

(Continued)

OTHER PUBLICATIONS

U.S. Appl. No. 16/086,351, filed Sep. 19, 2018, Inventor(s): Brown et al.
(Continued)

*Primary Examiner* — Mohamed A Kamara
(74) *Attorney, Agent, or Firm* — Patterson Thuente Pedersen, P.A.

(57) ABSTRACT

A VoWiFi service monitor monitors the logical data path to the ePDG of a MNO as an indication of whether VoWiFi service is possible for subscribers of the MNO network. Due to the standard configuration of UEs in preferring WLAN connectivity over LTE cellular connectivity, if the VoWiFi service is unavailable the UEs will not automatically switch to VoLTE while a WLAN connection is available between the UE and a hub. When a change in the status of an ePDG is detected, the VoWiFi service monitor informs any connected hubs. The hubs receive notifications from the VoWiFi service monitor and for each notification determine whether the ePDG status change affects one or more of the VoWiFi capable UEs connected to the hub. If at least one such device (Continued)

is affected by the change, the hub notifies the affected UE with instructions to handover from VoWiFi to VoLTE.

15 Claims, 8 Drawing Sheets

(51) Int. Cl.
*H04W 76/16* (2018.01)
*H04W 24/04* (2009.01)

(56) References Cited

U.S. PATENT DOCUMENTS

| | | | |
|---|---|---|---|
| 9,883,436 | B2 | 1/2018 | Brown et al. |
| 10,123,241 | B2 | 11/2018 | Brown et al. |
| 10,142,919 | B2 | 11/2018 | Brown et al. |
| 10,231,177 | B2 | 3/2019 | Ringland et al. |
| 10,356,706 | B2 | 7/2019 | Ringland et al. |
| 2005/0059400 | A1* | 3/2005 | Jagadeesan ........... H04W 36/30 455/436 |
| 2005/0271021 | A1 | 12/2005 | Alemany et al. |
| 2006/0240828 | A1 | 10/2006 | Jain |
| 2009/0046655 | A1 | 2/2009 | Zhao et al. |
| 2010/0003921 | A1 | 1/2010 | Godlewski |
| 2011/0002466 | A1 | 1/2011 | Kwak et al. |
| 2012/0170548 | A1* | 7/2012 | Rajagopalan ......... H04W 36/22 370/331 |
| 2012/0269182 | A1* | 10/2012 | Walker .................. H04W 8/04 370/338 |
| 2012/0315905 | A1 | 12/2012 | Zhu et al. |
| 2012/0324100 | A1 | 12/2012 | Tomici et al. |
| 2013/0121145 | A1 | 5/2013 | Draznin et al. |
| 2014/0313888 | A1 | 10/2014 | Linkola |
| 2015/0117209 | A1* | 4/2015 | Lee ....................... H04W 28/08 370/235 |
| 2015/0189556 | A1 | 7/2015 | Sidhu |
| 2015/0201363 | A1 | 7/2015 | Lundqvist et al. |
| 2015/0215832 | A1 | 7/2015 | Fitzpatrick |
| 2015/0282013 | A1 | 10/2015 | Kim |
| 2016/0073286 | A1 | 3/2016 | Wang |
| 2016/0095050 | A1 | 3/2016 | Lindheimer |
| 2016/0157239 | A1 | 6/2016 | Kaideren |
| 2016/0174110 | A1 | 6/2016 | Sharma et al. |
| 2016/0316425 | A1 | 10/2016 | Cili gencer et al. |
| 2016/0345256 | A1* | 11/2016 | Niranjan ............... H04W 48/20 |
| 2016/0373989 | A1 | 12/2016 | Tinnakornsrisuphap et al. |
| 2017/0034729 | A1 | 2/2017 | Persson et al. |
| 2017/0134261 | A1* | 5/2017 | Seo ......................... H04L 12/66 |
| 2017/0374597 | A1* | 12/2017 | Ray ....................... H04W 24/02 |
| 2018/0124630 | A1 | 5/2018 | Ringland et al. |
| 2018/0254979 | A1 | 9/2018 | Scahill et al. |
| 2019/0069328 | A1 | 2/2019 | Sharma |

FOREIGN PATENT DOCUMENTS

| | | | |
|---|---|---|---|
| EP | 2 925 056 A2 | 9/2015 | |
| WO | WO 2004/102919 A1 | 11/2004 | |
| WO | WO 2007/076147 A2 | 7/2007 | |
| WO | WO 2015/150745 A1 | 10/2015 | |
| WO | WO 2006/138019 | 12/2016 | |
| WO | WO 2017/167694 A1 | 10/2017 | |
| WO | WO 2017/167701 A1 | 10/2017 | |
| WO | WO 2018/002130 A1 | 1/2018 | |
| WO | WO2018/178241 | 10/2018 | |
| WO | WO2018/178293 | 10/2018 | |
| WO | WO2018/178294 | 10/2018 | |

OTHER PUBLICATIONS

Application and Filing Receipt for U.S. Appl. No. 16/087,827, filed Sep. 24, 2018, Inventor(s): Faus Gregori.
International Preliminary Report on Patentability for corresponding International Application No. PCT/EP2016/082894 dated Jul. 3, 2018; 9 pages.
International Search Report and Written Opinion for corresponding International Application No. PCT/EP2016/082894 dated Feb. 17, 2017; 12 pages.
3GPP TS 23.402 V13.4.0 (Dec. 2015) $3^{rd}$ Generation Partnership Project; Technical Specification Group Services and System Aspects; Architecture enhancements for non-3GPP accesses (Release 13); 650 Route des Lucioles—Sophia Antipolis Valbonne; 298 pages.
Ericsson; "W-Fi calling—extending the reach of VoLTE to Wi-Fi Wi-Fi calling—extending the reach of VoLTE to Wi-Fi", Jan. 30, 2015, XP055251865; 5 pages [retrieved Dec. 26, 2018].
International Preliminary Report on Patentability for PCT Application No. PCT/EP2017/057204 dated Oct. 2, 2018; 6 pages.
International Search Report and Written Opinion for PCT Application No. PCT/EP2017/057204 dated Apr. 21, 2017; 9 pages.
International Preliminary Report on Patentability for PCT Application No. PCT/EP2017/057225 dated Jul. 3, 2018; 10 pages.
International Search Report and Written Opinion for PCT Application No. PCT/EP2017/057225 dated May 18, 2017; 13 pages.
Kaufman et al.; "RFC 7296—Internet Key Exchange Protocol Version 2 (KIEv2)", Oct. 1, 2014, XP055243756, retrieved from the internet: http://tools.ietf.org/html/rfc7296#page-58.
Application as filed for U.S. Appl. No. 16/311,826, filed Dec. 20, 2018, Inventor(s): Brown et al.
International Search Report and Written Opinion for PCT Application No. PCT/EP2017/065977 dated Sep. 6, 2017; 10 pages.
Application as filed for U.S. Appl. No. 16/498,546, filed Sep. 27, 2019, Inventor(s): Ramirez et al.
Application as filed for U.S. Appl. No. 16/498,061, filed Sep. 26, 2019, Inventor(s): Ramirez et al.
Application as filed for U.S. Appl. No. 16/498,103, filed Sep. 26, 2019, Inventor(s): Ramirez et al.
Combined Search and Examination Report, Application No. GB1705248.1, dated Aug. 25, 2017, 6 pages.
International Search Report and Written Opinion, Application No. PCT/EP2018/058085, dated May 17, 2018, 19 pages.
PCT International Search Report for International Application No. PCT/EP2018/058202, dated May 2, 2018, 4 pages.
PCT Written Opinion of the ISA for International Application No. PCT/EP2018/058202, dated May 2, 2018, 7 pages.
Combined Search and Examination Report for GB application No. 1705262.2, dated Oct. 12, 2017, 4 pages.
PCT International Search Report for International Application No. PCT/EP2018/058199, dated May 17, 2018, 4 pages.
PCT Written Opinion of the ISA for International Application No. PCT/EP2018/058199, dated May 17, 2018, 14 pages.
EP Search Report for 17164395.0-1854, dated Sep. 22, 2017, 17 pages.
Combined Search and Examination Report for GB application No. 1705257.2, dated Aug. 17, 2017, 2 pages.
3rd Generation Partnership Project; Technical Specification Group Radio Access Network; Study on WLAN/3GPP Radio Interworking (Release 12), May 15, 2014 (May 15, 2014), XP050816244, Retrieved from the Internet https://www.3gpp.org/ftp/tsg_ran/WG2_RL2/TSGR2_83bis/Docs/.
Huawei: "How solutions 1, 2 and 3 work without ANDSF", vol. RAN WG2, No. Ljubljana, Slovenia; Oct. 7, 2013-Oct. 11, 2013, Sep. 27, 2013 (Sep. 27, 2013), XP050719049, Retrieved from the Internet https://portal.3gpp.org/desktopmodules/Specifications/SpecificationDetails.aspx?specificationId=2623.
Alcatel-Lucent, "Policy based terminal triggered, ANDSF decided access selection", 3GPP Draft; S2-081355_ANDSF Discussion, $3^{rd}$ Generation Partnership Project (3GPP), Mobile Competence Centre; 650, Route Des Lucioles; F-06921 Sophia-Antipolis Cedex; France, vol. SA WG2, No. Athens; Feb. 8, 2008, Feb. 8, 2008.
Alcatel-Lucent: "Policy based terminal triggered, ANDSF decided access selection", 3GPP Draft; S2-081658_Revision of 1355_ANDSF Discussion V2, 3rd Generation Partnership Project (3GPP), Mobile Competence Centre; 650, Route Des Lucioles; F-06921 Sophia-Antipolis Cedex; France, vol. SA WG2, No. Athens; Feb. 16, 2008, Feb. 16, 2008 (Feb. 16, 2008), XP050263998, 6 pages.

* cited by examiner

ASSISTED HANDOVER TO VOLTE IN CASE OF VOWIFI FAILURE

CROSS-REFERENCE TO RELATED APPLICATION

The present application is a National Phase entry of PCT Application No. PCT/EP2016/082894, filed Dec. 29, 2016, which claims priority from EP Patent Application No. 15203278.5, filed Dec. 31, 2015, each of which is hereby fully incorporated herein by reference.

TECHNICAL FIELD

The present disclosure relates to managing wireless communication services and in particular to a method and apparatus for controlling device handover between WLAN and cellular service access.

BACKGROUND

Cellular data networks provide data connectivity to mobile devices having cellular network interfaces. The network is formed of a network core for handling control plane functions and data packet routing, and a radio access network (RAN) of macrocell base stations located throughout the coverage area of the mobile network for wireless communication with subscriber mobile devices. An example of a cellular network architecture is Long Term Evolution (LTE). Unlike previous generation second generation (2G) and third generation (3G) cellular networks which offer packet switched data services on top of a circuit switched voice platform, LTE is an all-packet switched data network architecture that does not support the traditional voice calling platform.

Since LTE does not support traditional voice telephony, some mobile network operators provide traditional voice telephone services by making the mobile device switch from the LTE network to a 2G/3G service for the duration of a telephone call or when a short messaging service (SMS) is received. This process is known as Circuit Switched Fall-Back (CSFB).

CSFB provides a reliable way of handling voice calls but requires the network operator to maintain both the LTE and legacy networks, the former for data connectivity and the latter for voice telephony and slow data access where the LTE network coverage is lacking.

Wireless local area networks (WLANs) operating in accordance with the IEEE 802.11 family of standards (commonly referred to as Wi-Fi) are common in many user locations and provide data connectivity over a short geographic range. Typically the wireless local area network is generated and maintained by a wireless access point which acts as a packet routing interface between devices connected to the WLAN (e.g. smartphones, tablets) and local devices connected via a wired interface (televisions, network attached storage). The wireless access point serves local devices and will typically be co-located, or integrated with an external network interface such as a modem for providing a backhaul link to external networks such as the Internet via an Internet Service Provider's core network. Example backhaul technologies include Digital Subscriber Line (xDSL) copper/fiber and cable based on the Data over Cable Service Interface Specifications (DOCSIS) architecture.

Such a combined WLAN, routing and modem device will be referred to as a hub throughout the description.

Both LTE and WLANs are examples of packet switched data networks in which application data is split into packets and the packets can take any path within the network to arrive at the receiver. In contrast the circuit switched networks require a dedicated data path to be established prior to sending data along the dedicated circuit.

VoIP/VoLTE/VoWiFi

Voice over Internet Protocol (VoIP) applications are known for allowing voice communication via a packet switched network. The voice data is sampled into packets of voice data and the packets are sent over the data network. Although the packets may arrive in a different order to the transmission order, packet loss is tolerated because latency has a greater negative effect on the quality of experience to the users.

VOIP applications are Over-The Top (OTT) services which typically require a user to generate a username identity and generally a VoIP call can only be established between two users having the same VoIP application on their mobile devices. Even where the VoIP application allows calls to conventional telephones and the caller information display shows the caller's telephone number, when the callee tries to return the call, the call goes to the standard dialer and not the VoIP application.

Furthermore, in the VoIP service it is not possible to maintain a call if the mobile device moves out of range of the current access point and requires a handover from one access technology to another.

Voice over LTE (VoLTE) is a voice service running over LTE uses optimized headers and priority marking to provide a voice service using the packet switched network with an aim to reducing/replacing the reliance on CSFB and VoIP. This will reduce operating overheads and may allow parts of the legacy 2G and 3G platforms to be switched off.

Due to the prevalence of WLANs in many areas, the Voice over Wi-Fi (VoWiFi) or Wi-Fi Calling service has also been deployed by several network operators. In VoWiFi, the WLAN is regarded as a non-3GPP access network base station to the LTE network so that voice calls are made and received using the standard telephony software and packet data is tunneled to and from the cellular network core. VoWiFi therefore appear to extend the cellular network coverage to indoor locations and allows handover to a normal VoLTE or CSFB service when the mobile device moves to an outdoor location.

Mobile devices such as smartphones will therefore have both a cellular network interface and a WLAN interface for data connectivity. Traditionally WLANs offer faster, more reliable and unmetered service so the mobile device is configured to prefer the WLAN interface for all data connectivity when both WLAN and cellular access is available.

With the conventional processing, the mobile device is only concerned with the quality of the WLAN signal to the hub. As long as the WLAN signal strength is above a signal strength threshold, the mobile device will stay connected to the WLAN even if there is no onward connection the external networks such as the Internet. This can cause confusion for users because the phone displays a strong WLAN connection (typically via an icon with various bars to indicate signal strength) but the data services do not connect.

SUMMARY

The present disclosure addresses the above problems.

In one aspect, an embodiment of the present disclosure provides a method of operating a wireless network access point to control access of at least one mobile device to a voice service located in a cellular network and accessible via the wireless access point, the wireless access point having a wireless network interface for communication with the at least one mobile device via a wireless link and a wide area network interface for communication with a wide area network, and the at least one mobile device having a wireless network interface for communication with the wireless network access point and the voice service via a cellular gateway device located at the logical edge of the cellular network, and also having a cellular network interface for communication with the voice service via the cellular network, the method comprising: processing presence information relating to the cellular gateway device to determine whether the cellular gateway device is available; if the cellular gateway device is determined to be unavailable, determining whether the at least one mobile device will lose access to the voice service via the cellular gateway device; and if the at least one mobile device will lose access to the voice service via the cellular gateway device, instructing the at least one mobile device to connect to the voice service via the cellular network instead of the cellular gateway device.

In a further aspect, an embodiment of the present disclosure provides an apparatus for controlling access of at least one mobile device to a voice service located in a cellular network and accessible via the wireless access point, the at least one mobile device having a wireless network interface for communication with the wireless network access point and the voice service via a cellular gateway device located at the logical edge of the cellular network, and also having a cellular network interface for communication with the voice service via the cellular network, the apparatus comprising: a wireless network interface for communication with the at least one mobile device via a wireless link; a wide area network interface for communication with a wide area network; means for processing presence information relating to the cellular gateway device to determine whether the cellular gateway device is available; means for determining, in the event that the cellular gateway device is determined to be unavailable, whether the at least one mobile device will lose access to the voice service via the cellular gateway device; and means for instructing the at least one mobile device to connect to the voice service via the cellular network instead of the cellular gateway device if at least one mobile device will lose access to the voice service via the cellular gateway device.

BRIEF DESCRIPTION OF THE DRAWINGS

Embodiments of the present disclosure will now be described with the aid of the accompanying Figures in which.

DESCRIPTION

System Overview

Figure 1:
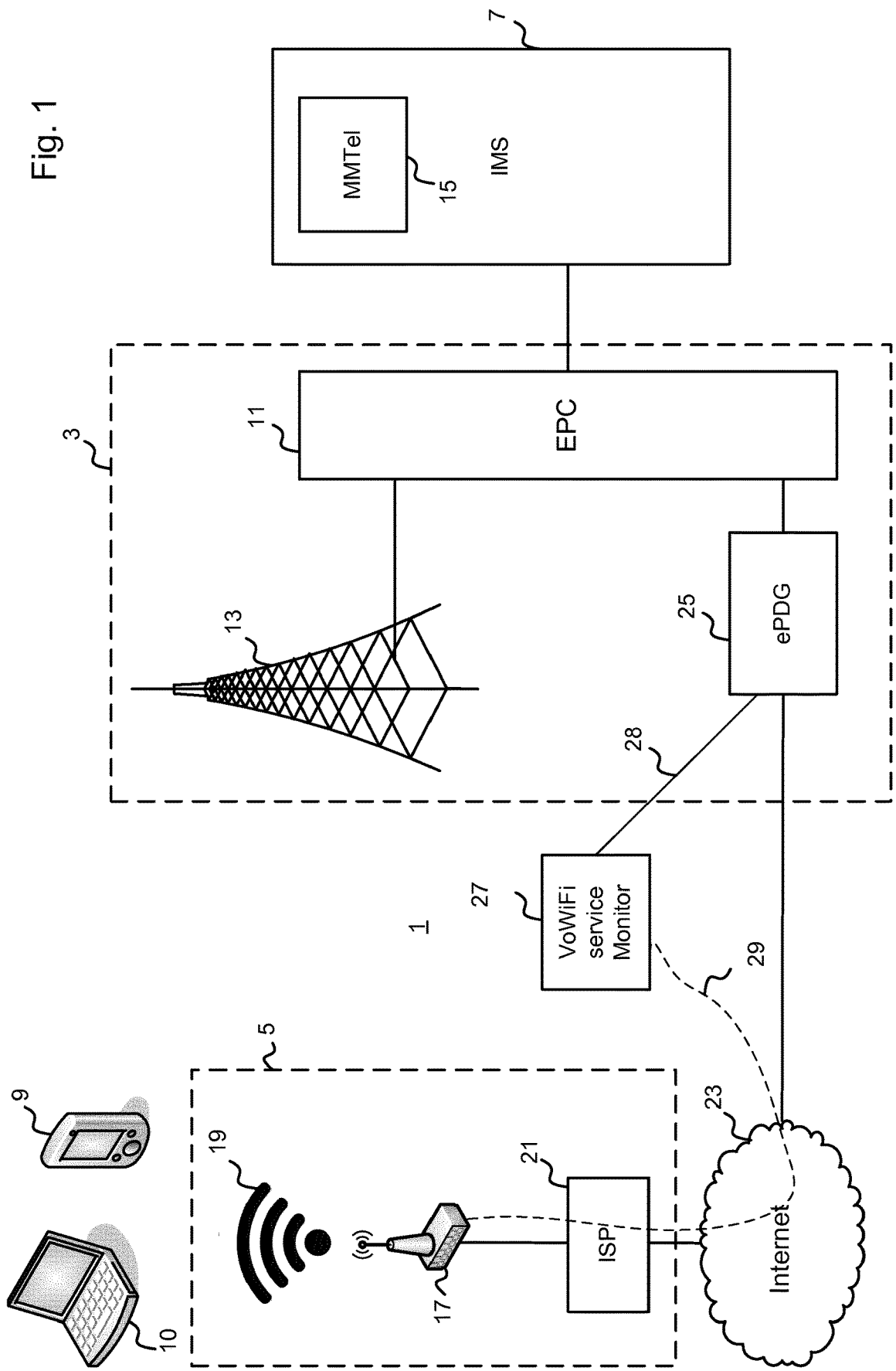
FIG. 1 schematically shows an overview of a telecommunications network of the first embodiment.

FIG. 1 shows an overview of the main components in a telecommunications communication system 1 according to the first embodiment. The system 1 has several functional subsystems:
  a Long Term Evolution (LTE) cellular network 3 infrastructure;
  non-cellular network infrastructure 5 including a local network and Internet Service Provider (ISP) architecture; and
  an IP Multimedia Subsystem (IMS) 7.

The LTE cellular network 3 provides cellular network client devices, known as User Entities (UE) such as mobile telephones 9 with data and voice services using a packet-switched IP network in contrast to the older circuit switched networks. The LTE cellular network includes a network core 11 and a radio access network formed of eNodeBs 13 for connecting services and resources in the network core 11 to the UEs 9. The network core 11 contains the standard control functions such as a Multimedia Mobility Entity (MME) (not shown), a Home Subscriber Server (HSS) (not shown), and a Policy Configuration Rules Function (PCRF) (not shown). For routing data packets to remote resources, there are a number of Serving Gateways (SGW) (not shown) and Packet Gateways (PGW) (not shown).

The IMS 7 is an IP data network which provides a unified service architecture for all networks. Multiple services can be provided on a single control/service layer even though the access networks may be different. The IMS 7 therefore reduces the need for duplication in data services/applications. The VoLTE and VoWiFi voice calling services are hosted in an application server 15 within the IMS 7 which in this embodiment is provided by a service known as the Multimedia Telephony Service (MMTel).

The non-cellular network infrastructure 5 includes a wireless access point/modem router device 17, hereinafter referred to as a hub, located in the home generating a wireless local area network (WLAN) 19 in accordance with the IEEE 802.11 family of standards to allow communication with UEs 9 and also WLAN only devices such as a computer 10. For external network access, the hub 17 communicates with an Internet Service Provider (ISP) 21 which routes data via a wide area network such as the Internet 23 to external servers and users.

Due to the ability of the LTE cellular network 3 to use non-cellular access for applications such as Wi-Fi-Offload, the LTE cellular network 3 also includes an Evolved Packet Data Gateway (ePDG) 25 which acts as a termination point for IPSec tunnels with the UE over non-trusted 3GPP IP systems. This allows data into the EPC network core 11 for processing within the LTE cellular 3 and IMS 7 networks.

The system in FIG. 1 also includes a VoWiFi service monitor 27 which is a network component maintained by the ISP or a third party. As shown in FIG. 1, the VoWiFi service monitor has a data link 28 to the ePDG 25 and also a data link 29 to the hub 17. The VoWiFi service monitors whether the ePDG 25 is accessible, and therefore VoWiFi is available, on behalf of the hub 17 and informs the hubs of any changes in the accessibility of the ePDG 25 over time.

The UE 9 has both WLAN and LTE radio interfaces for accessing the non-cellular network infrastructure and the LTE cellular network respectively and the UE 9 supports VoLTE, VoWiFi and CSFB voice calls. To highlight the difference between UEs 9 and other connected WLAN devices 10, the computer 10 only has a WLAN interface and therefore can only access the WLAN 19 of the hub 17 but not the cellular network 3 since it does not have an interface capable of sending and receiving LTE signals.

Behavior of UE for activating Wi-Fi and LTE interfaces

As mentioned above, the UE 9 has both WLAN and LTE interfaces and is capable of both VoLTE and VoWiFi call handling. Since an eNodeB 13 of the LTE network has a larger geographical coverage range than a WLAN 19, in general the UE will be connected to the LTE network 3 and will use VoLTE.

However, when the UE is within range of a WLAN 19 such as shown in FIG. 1, there is overlap in the connectivity ranges, and the UE 9 could connect to data services using either the cellular interface or the WLAN interface. In general, the default policy is that a WLAN connection is preferred. So when a UE is connected to the LTE network and it detects a known WLAN, the UE will try to use the WLAN.

Therefore upon detection of a known WLAN, the UE 9 will enable its WLAN interface and disable the cellular interface causing any existing services to also be disconnected. This change is generally transparent to the user of the UE as it has little impact to the operation of services such as file transfers and web browsing. However, the general UE policy of preferring WLANs to cellular data interfaces can have an impact on the Quality of Experience for users of voice services using VoWiFi instead of VoLTE.

In particular, the VoWiFi service is only available when the UE 9 has a data link to the MMTel service 15 in the IMS 7 via the ePDG 25. If the ePDG 25 is not operational, then the UE cannot communicate access the MMTel service and therefore will not be able to make and receive voice calls using VoWiFi.

However, as long as the UE detects the WLAN 19, it will maintain the WLAN connection in preference to the LTE connection. Therefore even if there is no connection to the VoWiFi service, the UE 9 will remain connected to the WLAN 19 which may result in the user of the UE missing voice calls because the phone is not registered on either the VoWiFi or the VoLTE services.

In the embodiment, the hub 17 is aware that some connected devices can use VoWiFi and so it uses information from the VoWiFi service monitor 27 regarding the accessibility of the ePDG 25, and therefore the availability of the VoWiFi service, to manage UEs access to VoWiFi.

Figure 2:
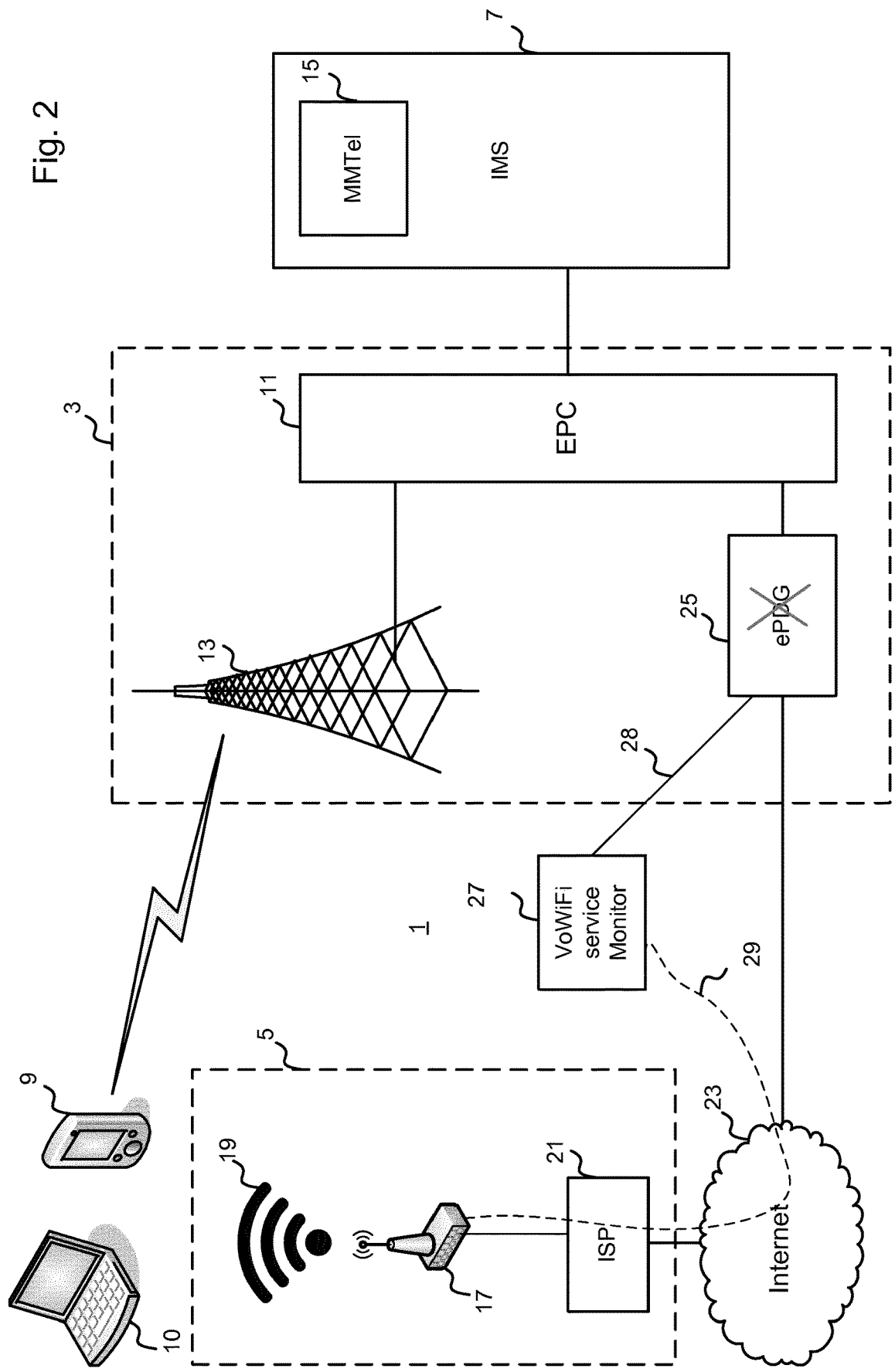
FIG. 2 schematically shows the behavior of a hub and UE in the telecommunications network when a link to a VoWiFi service component is disrupted.

As shown in FIG. 2, if the ePDG 25 loses service, the VoWiFi service monitor will notice the loss of service for example because the logical data link 28 is down, and inform the hub 17 that the ePDG 25 is not available. With the new data, the hub can then notify connected VoWiFi capable UEs 9 using the VoWiFi service for that MNO that in order to maintain voice connectivity, the UEs 9 should handover to VoLTE despite the WLAN 19 being available.

Since it is only the ePDG 25 or the link to the ePDG 28 which is determined to be inaccessible, the UE 9 may switch to VoLTE and LTE for all data services, or maintain both wireless connections so that LTE is used for VoLTE but all other data services use Wi-Fi.

The VoWiFi service monitor 27 constantly monitors the link to the ePDG and when the ePDG 25 or the connection to the ePDG 25 is restored, the hub 17 is notified so that it can instruct connected UEs 9 that handover back to VoWiFi is available.

The components of the hub will now be described with reference to FIG. 3.

Figure 3:
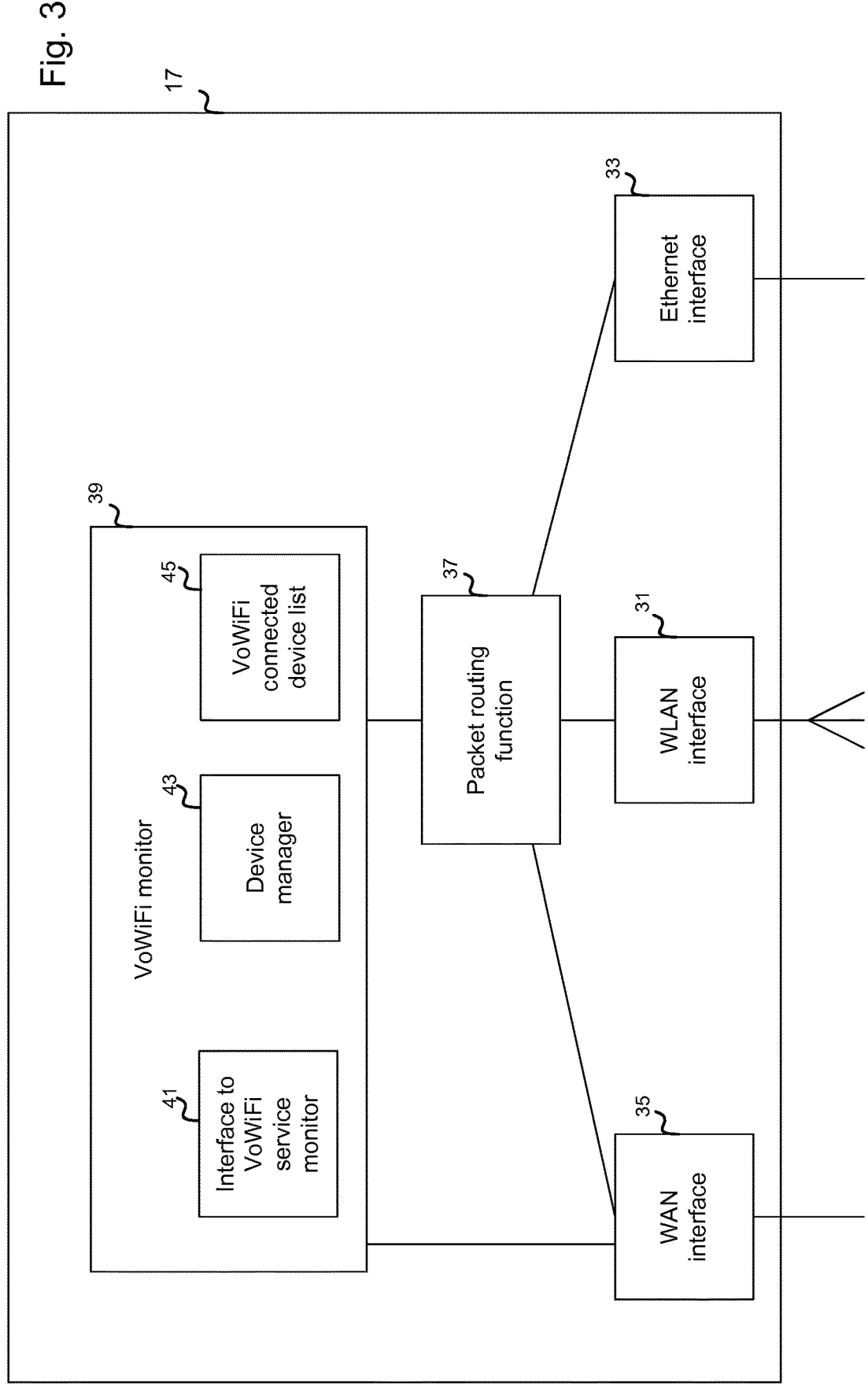
FIG. 3 schematically shows the internal components of a hub in accordance with the first embodiment.

FIG. 3 shows the internal components of the hub 17 in more detail. The hub 17 contains a number of network interfaces for communication with various types of network device. For local devices, there is a Wireless Local Area Network (WLAN) interface 31 for communication with wireless devices using a wireless protocol such as the IEEE 802.11 family of wireless LAN standards known as Wi-Fi. In this embodiment, the WLAN interface 31 is compliant with the 802.11ac standard for WLAN operation. For wired LAN devices there is an Ethernet interface 33 in accordance with the IEEE 802.3 standards.

For connectivity to the Internet Service Provider (ISP), the hub 17 has a Wide Area Network (WAN) interface 35 which in this embodiment is a modem compliant with the Digital Subscriber Line (xDSL) family of standards such as Very High Speed DSL (VDSL) modem. In an alternative where the ISP is based on Data Over Cable Service Interface Specification (DOCSIS), the WAN interface 35 is a cable modem compliant with the DOCSIS cable standards.

The hub 17 also contains a packet routing function 37 which is responsible for managing the flow of data packets between the three interfaces 31, 33, 35. The packet routing function 37 processes the headers of incoming packets received on the three interfaces 31, 33, 35 and determines where to send the packets for onward delivery to the intended packet destination. The packet routing function 37 will also include functions such as Network Address Translation (NAT) for directing packets between the local interfaces 31, 33 and the WAN interface 35.

To process the information from the VoWiFi service monitor 27 and apply the information to connected UEs 9, the hub 17 contains a VoWiFi monitor function 39. This function is connected to the WAN interface 35 and the packet routing function 37 and is responsible for communication with the VoWiFi service monitor 27 to determine when UEs 9 would not be able to use VoWiFi and if required to notify the UEs 9 to switch to VoLTE.

The VoWiFi monitor function 39 contains an interface to the VoWiFi service monitor 41, a UE manager 43 and a VoWiFi connected client list 45.

The interface to the VoWiFi service monitor 41 is linked to the VoWiFi service monitor 27 via data link 29 to receive status information about the ePDG 25 of the MNO 3. The connected device list 45 contains the identity of any UEs 9 which are using the VoWiFi service. The connected device list 45 is a subset of the total population of devices connected to the WLAN. Whilst any WLAN capable device 9, 10 can connect to the hub 17 provided it has the relevant credentials, not every device will be VoWiFi capable. For example, certain smart phones have both VoLTE and VoWiFi capability and, but older smartphones, laptops and computers will not be capable of supporting VoWiFi and therefore will not benefit from the processing of the first embodiment. Furthermore, some smartphones may have the relevant hardware, but the service has not been enabled by their MNO. It is therefore important for the hub 17 to identify a set of VoWiFi capable UEs from the total population of connected UEs on the WLAN to reduce its processing load.

In this embodiment, the hub 17 makes a passive determination of whether the device is operating a VoWiFi service by analyzing the address information of data packets sent between UEs and external resources.

The VoWiFi monitor 39 retrieves a list of known ePDG addresses from an ePDG directory. The ePDGs are gateways to link Non-Trusted Non-3GPP networks to network operator EPCs and IMS services. The addresses of the ePDGs are publically known and therefore can be provided by the ISP 21 to the hubs 17 via a management service such as TR-069 or similar method for ISP 21 to hub 17 communication. Alternatively the VoWiFi service monitor 27 provides a list of ePDGs it is monitoring during a registration process by the hub.

The VoWiFi monitor 39 identifies VoWiFi capable UEs 9 from the total set of connected WLAN devices by analyzing the IP Flows traversing the hub 17. In particular any IP Flows which have an ePDG gateway address as destination can be assumed to be an IP flow for VoWiFi traffic between a VoWiFi capable UE 9 and the MMTel voice service 15. If any such flows are present, the VoWiFi monitor 39 extracts the device information such as MAC address and saves a mapping between the UE 9 and the IP address of the ePDG of the subscriber MNO so that the hub has a record of the subset of WLAN devices 9 which are VoWiFi capable and are using or have used the VoWiFi service to a known ePDG 25.

Monitoring IP flows relies on the standard processing of a UE 9 which is capable of VoWiFi service to establish the IPSec tunnel to the ePDG 25 as soon as it connects to the WLAN 19 in order to register and/or handover to VoWiFi from VoLTE. Therefore devices which do not establish a connection to an ePDG are considered to be standard WLAN devices.

The scanning process is periodically performed by the VoWiFi monitor 39 to maintain the validity of the connected client list 45 so that any new devices 9 that connect to or disconnect from the WLAN 19 are identified. In this embodiment, the scan is performed every 5 minutes.

Furthermore, in accordance with this embodiment, the connection client list also contains entry fields for storing the status of the various ePDGs. The data is provided by the VoWiFi service monitor as will be described later.

The UE manager 43 is responsible for communicating with the VoWiFi capable UEs 9, details of which are stored in the connected client list, and especially to inform those UEs 9 when the ePDG is unavailable and also when the ePDG is available again after a service disruption.

Further details about the operation of the hub 17 and VoWiFi monitor function 39 will be described later once the other network components have been described.

Figure 4:
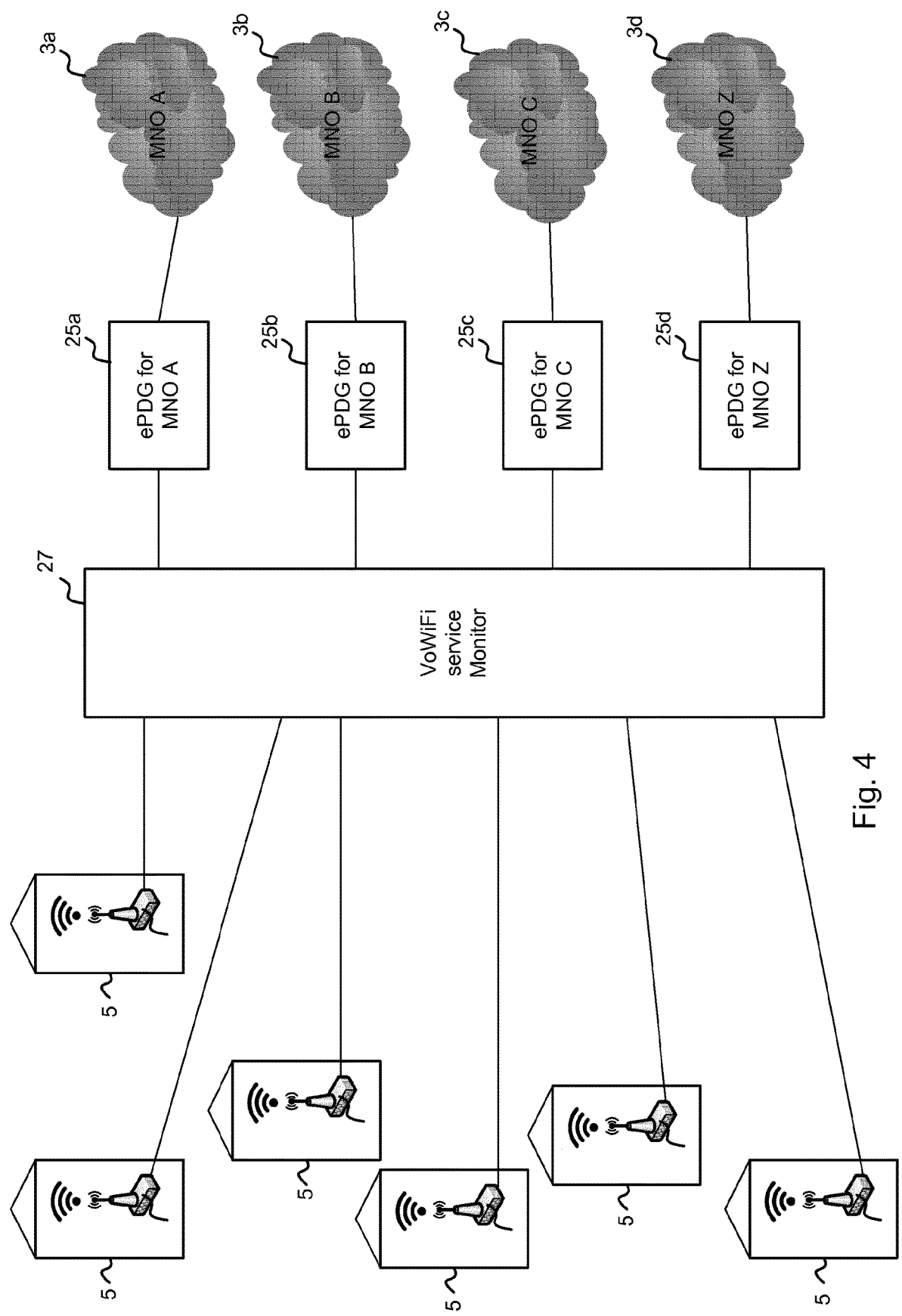
FIG. 4 schematically shows an overview of the connections formed by a VoWiFi service monitor to plural hubs and plural ePDGs of various MNO networks.

In most countries, there is more than one MNO to improve competition and provide more subscriber choice. Therefore monitoring a single MNO as shown in FIG. 1 is not sufficient because the UEs 9 within the local area network are probably subscribed to different MNOs. FIG. 4 shows the typical configuration of the VoWiFi service monitor 27 in relation to various hubs 17 and different ePDGs 25 of MNOs 3.

The VoWiFi service monitor 27 is configured with the details of each MNO 3 in a service area so that each ePDG 25 corresponding to a VoWiFi capable MNO 3 can be monitored for service availability. In FIG. 4, four MNOs 3a, 3b, 3c, 3d are shown, providing a VoWiFi service and each having a respective ePDG 25 to allow access from external networks.

The VoWiFi service monitor 27 is also connected to a plurality of hubs, each serving different UEs 9 which are subscribed to one of the four MNOs 3a, 3b, 3c, 3d. Using the information collected from the ePDG monitoring, the VoWiFi service monitor can therefore send information about the status of each ePDG to each hub 17 periodically.

By making a central collector of ePDG status information, the number of status requests to the ePDGs is minimized.

Figure 5:
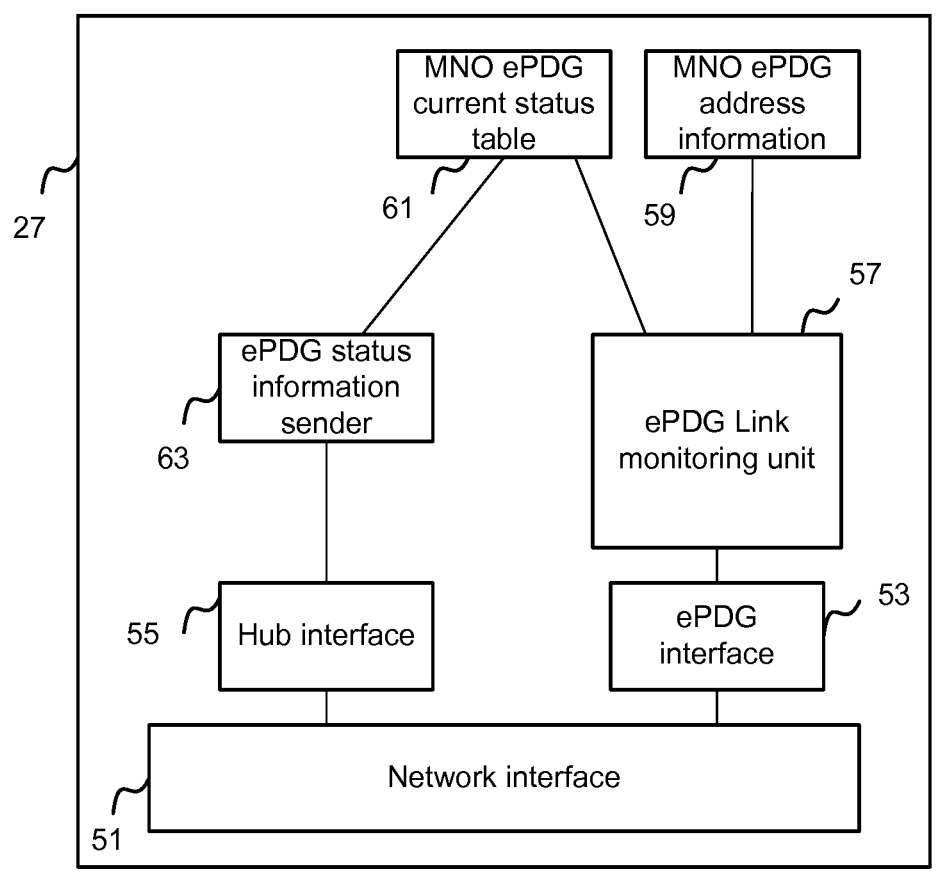
FIG. 5 schematically shows the components of a VoWiFi service monitor in the first embodiment.

FIG. 5 shows the functional components of the VoWiFi service monitor 27.

The VoWiFi service monitor 27 is configured as a server and contains a network interface 51 for external device communication. The network interface 51 can be divided into two main interfaces, an ePDG interface 53 for communication with the ePDGs 25 and a hub interface 55 for communication with the hubs 17.

An ePDG link monitoring unit 57 controls communication via the ePDG interface 53 which receives input from a MNO ePDG address information data store 59 which contains pre-stored IP address information for the location of each ePDG. In this embodiment, the status of the ePDG is determined by Pinging the address of the ePDG. If each set in the ping is successfully transmitted and acknowledged, then the logical data to the ePDG is deemed to be an indication that the ePDG is functioning correctly. If the pings are lost, then a problem is assured to have occurred either at the ePDG or the Wi-Fi link and therefore the ePDG is deemed to be inaccessible.

A MNO ePDG current status table holds the information relating to the results of the ePDG status scan.

An example of the contents of the MNO ePDG current status table is shown below. In the example all ePDGs for the set of MNOs are determined to be available.

TABLE 1

| MNO | ePDG Destination IP (via secure tunnel) | Logical Link state |
| --- | --- | --- |
| 3a | MNO 3a ePDG server IP | UP |
| 3b | MNO 3b ePDG server IP | UP |
| 3c | MNO 3c ePDG server IP | UP |

In this embodiment, the network availability of the ePDG associated with an MNO 3 is used as the indicator for whether the VoWiFi is/will be available to UEs 9. This is because the ePDG is the publicly addressable entry point to the MNO network. All VoWiFi traffic must travel via this network component between the MMTel service and any UEs 9 using VoWiFi. Therefore if access to the ePDG is disrupted then the VoWiFi service will not be available to any UEs 9.

The VoWiFi service monitor 27 is configured to monitor the logical network path between devices in the public network domain and the edge of the MNO network represented by the ePDG. Although the network paths will not be identical, if the VoWiFi network monitor 27 can establish contact with the ePDG, then other publically addressable devices such as the hub and UEs 9 should also be able to form a logical data path to the ePDG.

On the hub facing side of the VoWiFi service monitor 27, an ePDG status information sender is responsible for registering hubs subscribing to the monitoring service and using the data in the MNO ePDG current status table to notify registered hubs about ePDG status.

Figure 6:
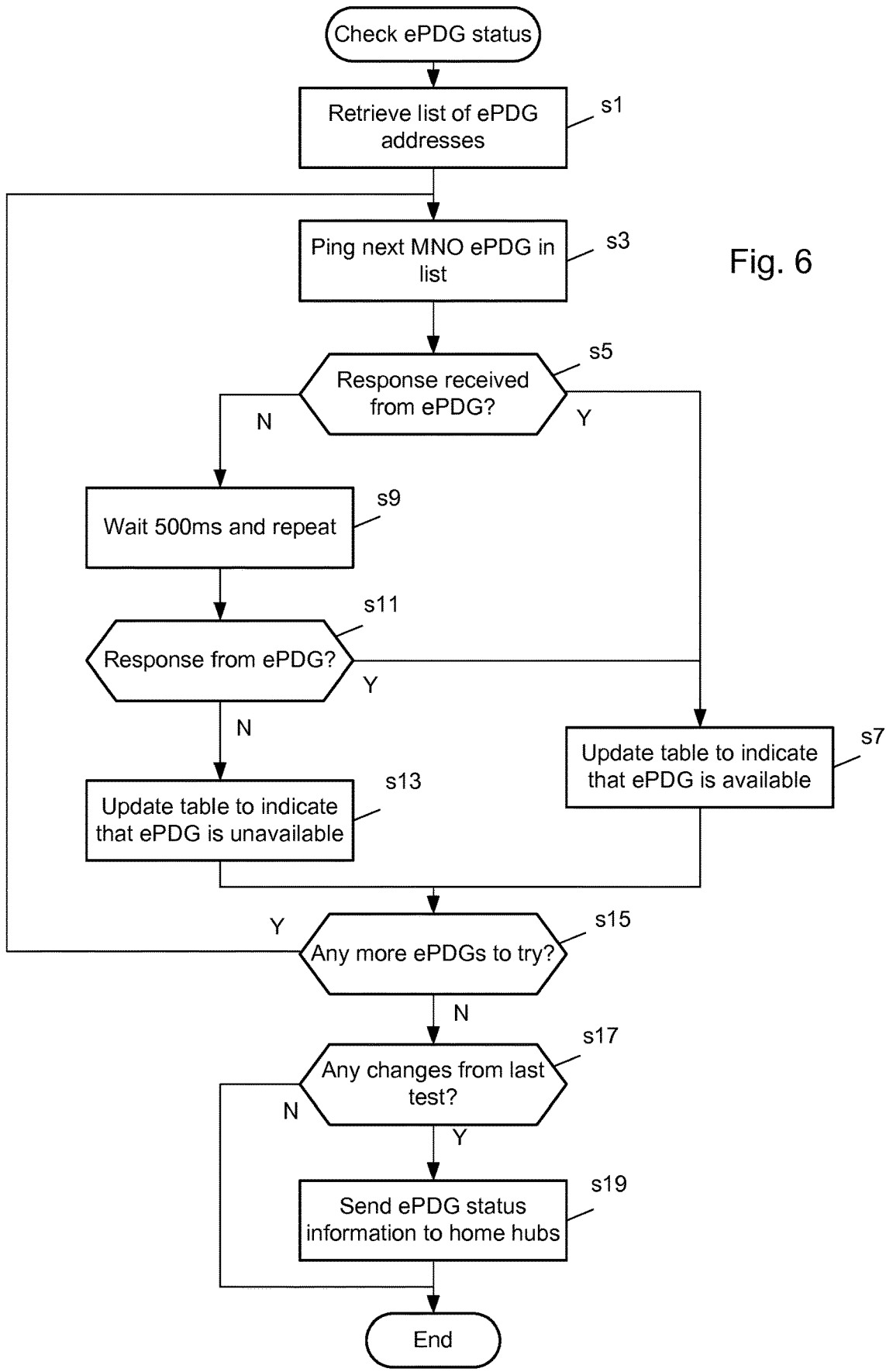
FIG. 6 is a flowchart showing the operation of the VoWiFi service monitor in checking the link status to the MNOs.

FIG. 6 is a flowchart showing the operation of the components of the VoWiFi service monitor 27.

In s1, the list of ePDG addresses are retrieved from the MNO ePDG address information data store 59. This list indicates the publically accessible IP address of each ePDG 25 in the country or region of operation covered by the VoWiFi service monitor 27 which in this example is 4 MNOs. The address information is provided and installed by a system administrator. This address information can also be changed by the system administrator when the ePDG addresses change or there is temporary offline maintenance.

In s3, the ePDG link monitoring unit 57 selects one of the ePDGs in the list 59 and pings the address for a period of time or number of messages. This is to establish whether the ePDG is still publically accessible.

In s5, a test if performed to determine whether a response has been received from the ePDG.

If a response to the ping was received, then processing proceeds to s7 which updates the MNO ePDG current status table 61 to indicate that the ePDG is available.

If the rest in s5 fails, the ePDG link monitoring unit 59 waits for a period of time, in this case 500 ms in s9 before checking again for a test in s11. If a response is received, then processing proceeds to s7 described above.

If a response is still not received, then it is assumed that the link to the ePDG link or the ePDG itself is down and in s13 the MNO ePDG current status table 61 is updated to indicate the lack of service.

After s13 and s7, in s15 a test is carried out to determine whether there are any further ePDGs in the list to try. If there are more ePDGs then processing returns to s3 so that more ePDGs can be tested.

For example, if the ePDG service monitor 27 can reach the ePDGs 25a and 25b but cannot reach the ePDG 25c of MNO 3c, then the MNO ePDG current status table 61 would be updated to the following:

TABLE 2

| MNO | ePDG Destination IP (via secure tunnel) | Logical Link state |
|---|---|---|
| 3a | MNO 3a ePDG server IP | UP |
| 3b | MNO 3b ePDG server IP | UP |
| 3c | MNO 3c ePDG server IP | DOWN |

After s15, if there are no further ePDGs to try, a test is carried out in s17 to determine whether there have been any changes to the MNO ePDG current status table 61 information. If there have not been any, then the currently held information is accurate and since there is no need to send the same information twice, processing ends.

However, if there are changes, then in s19 in the first embodiment, the ePDG status information is sent to all hubs 17 and processing ends.

With the above processing, the VoWiFi service monitor 27 can provide hubs 17 with current information about the status of the ePDGs 25 so that the hubs are aware of service loss and service restoration in order to inform connected VoWiFi and VoLTE capable UEs 9 when they should switch services.

The VoWiFi service monitor 27 provides a centralised network entity for monitoring the status of the ePDGs 25 thereby reducing the complexity of the hubs 17 and reducing network traffic in determining the ePDG status.

Figure 7:
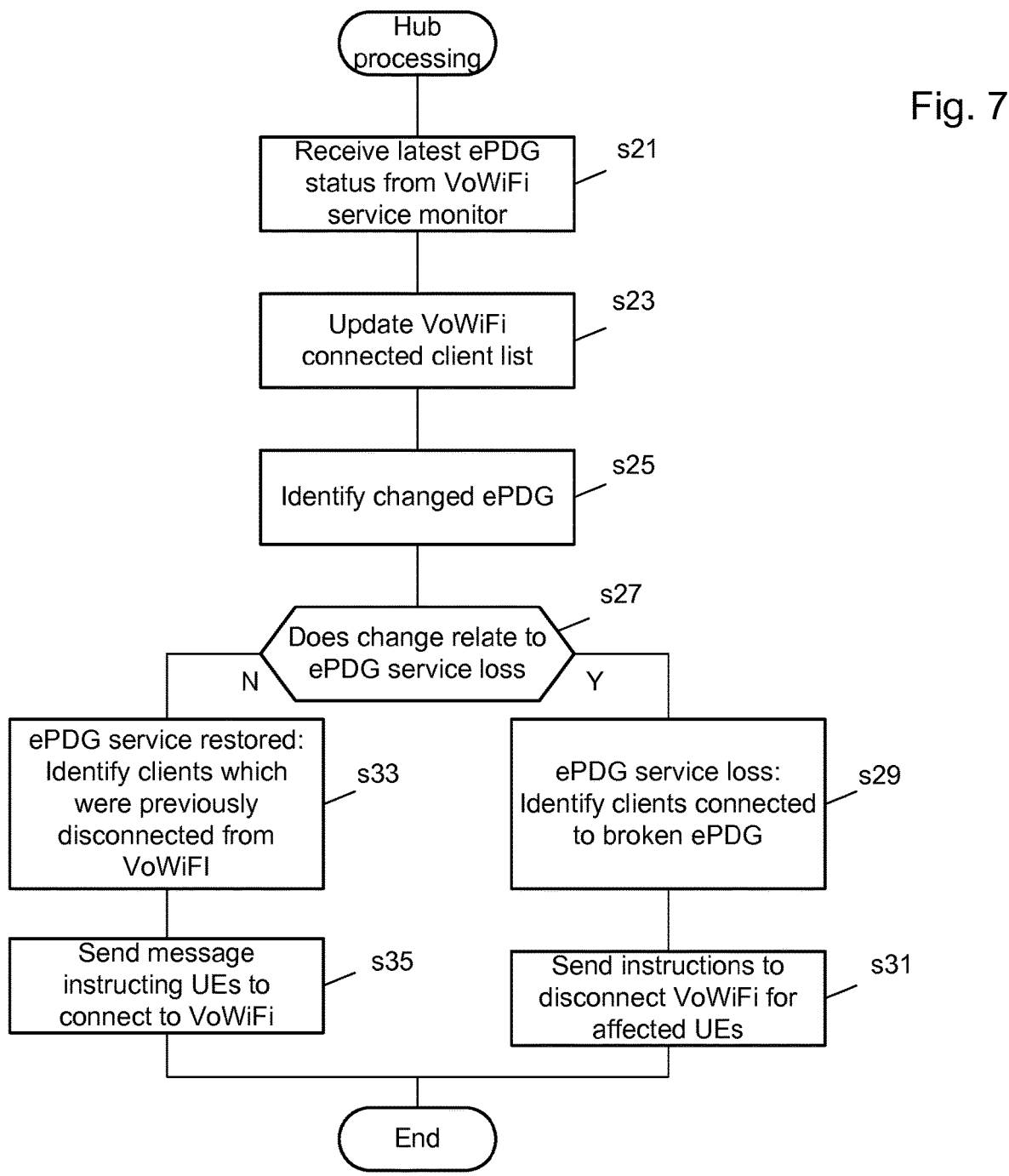
FIG. 7 is a flowchart showing the operation of the hub to cause UEs to disconnect or reconnect to VoWiFi from VoLTE.

The processing of each hub 17 connected to the VoWiFi service monitor 27 will now be described. FIG. 7 is a flowchart showing the operation of the hubs 17 in response to a status message from the VoWiFi service monitor 27. As explained above, the VoWiFi service monitor 27 will only send a new status message when a change has been detected in the logical link to at least one of the ePDGs.

In s21 the latest ePDG status message is received by the interface to the VoWiFi service monitor 41. In s23, the contents of the message are used to update the hub's 17 VoWiFi connected client list 45.

For example, if the earlier contents of the connected client list 45 had contained the following data prior to the reception of the latest ePDG status message:

TABLE 3

| Connected Devices | UE MAC address | VoWiFi Destination IP | VoWiFi service logical link state |
|---|---|---|---|
| 9a | D8:BD:3C:38:D4BB | MNO 3a ePDG server IP | UP |
| 9b | C3:BB:3C:38:A4:BB | MNO 3a ePDG server IP | UP |
| 9c | D2:BB:3C:22:A4:AA | MNO 3b ePDG server IP | UP |
| 9d | A3:CA:3C:21:B2:AC | MNO 3c ePDG server IP | UP |

This would indicate that there are four VoWiFi capable devices 9a-9d. Two of the devices 9a and 9b are subscribers of a first MNO 3a, the third listed connected device 9c is a subscriber of the second MNO 3b and the fourth listed connected device 9d is a subscriber of the third MNO 3c.

Following the reception of the latest ePDG status message containing information that ePDG 25c is not contactable, the connected client list 45 would be updated as follows:

TABLE 4

| Connected Devices | UE MAC address | VoWiFi Destination IP | VoWiFi service logical link state |
|---|---|---|---|
| 9a | D8:BD:3C:38:D4BB | MNO 3a ePDG server IP | UP |
| 9b | C3:BB:3C:38:A4:BB | MNO 3a ePDG server IP | UP |
| 9c | D2:BB:3C:22:A4:AA | MNO 3b ePDG server IP | UP |
| 9d | A3:CA:3C:21:B2:AC | MNO 3c ePDG server IP | DOWN |

In s25, the changed ePDG 25c is identified, in this example the status of the ePDG 25c for MNO 3c has changed.

In s27, the type of change is determined and in particular whether the ePDG status change relates to a service loss. If the ePDG status is a service loss, the processing moves to s29 where the connected client list 45 is reviewed to determine if there are any connected UEs which are affected by the service loss.

In the example, device 9d is a subscriber of MNO 3c and therefore they will have lost VoWiFi connectivity even though the UE 9d will not have noticed since the Wi-Fi link between the UE 9d and the hub 17 is still active. Therefore UE 9d must be informed about the service loss.

In s31, the hub 17 sends a notification message to any affected UEs, in this example only one UE is affected. The notification message includes instructions to tell the affected UE to disconnect from the VoWiFi service and processing ends.

If in s27 it is determined that the status change is not a service loss but a service restoration, then in s33 the VoWiFi monitor 39 of the hub 17 will perform processing to identify affected devices which have previously disconnected from VoWiFi, and then in s35 any identified devices are sent an instruction message to cause the affected UE to reconnect to VoWiFi from VoLTE. Processing then ends.

With the above processing, the hubs 17 are responsible for detecting changes in the ePDG status based on updates from the VoWiFi service monitor 27 and then determining if any of their locally connected devices are affected by the ePDG change. If any connected devices are present, the hub in this embodiment is responsible for managing the handover behavior of the UEs from VoLTE to VoWiFi and from VoWiFi to VoLTE.

Figure 8:
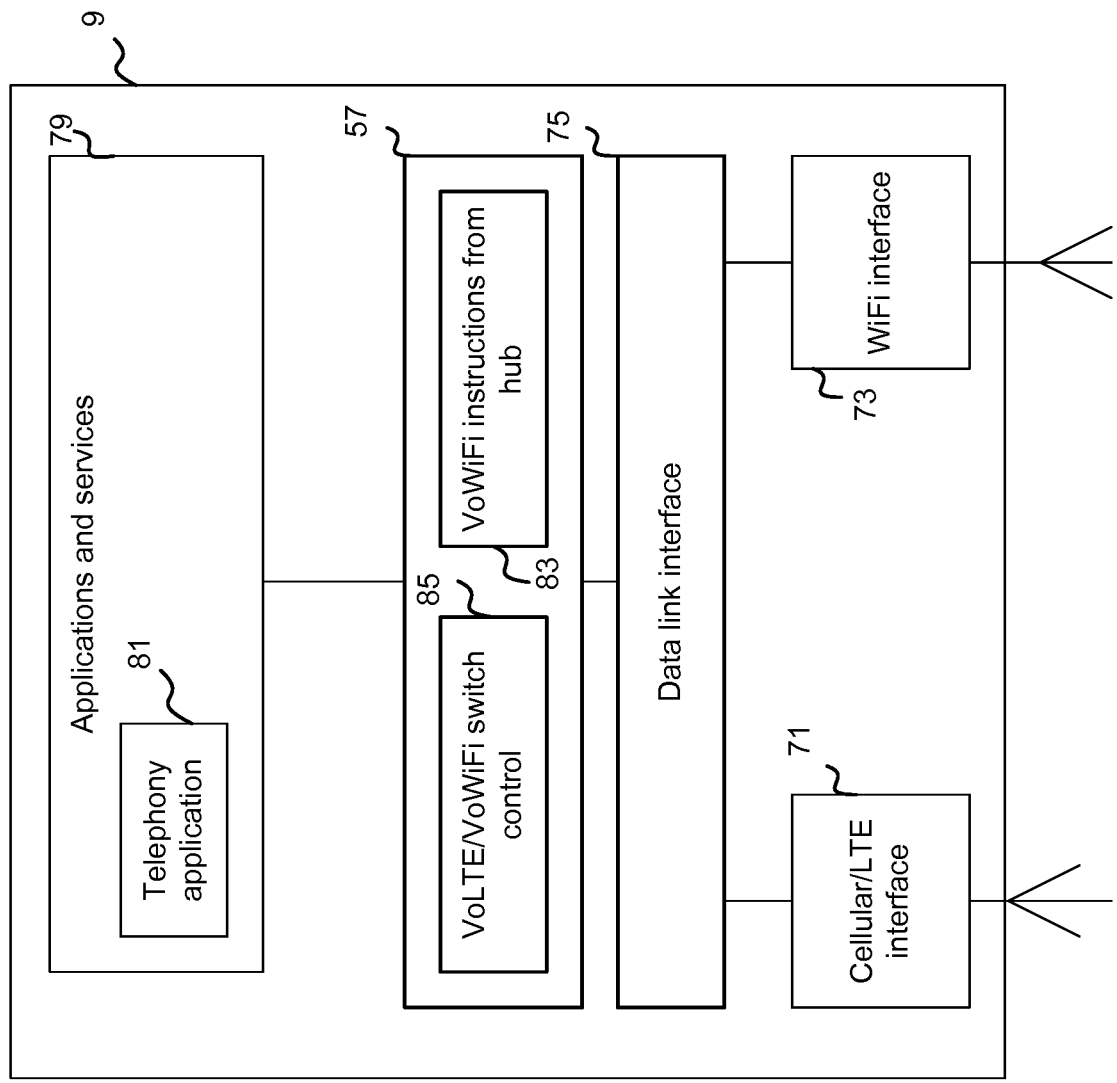
FIG. 8 schematically shows the internal components of a user entity device in accordance with the first embodiment.

The components of the UE 9 will now be described with reference to FIG. 8.

The UE 9 contains a cellular network interface 71 and a WLAN interface 73. The cellular interface 71 is compatible with the eNodeB 13 of the cellular network 3 and the WLAN interface 73 is compatible with the WLAN interface 31 of the hub 17.

Since either interface 71, 73, may be used by the UE 9, a data link interface 75 is responsible for enabling and disabling each interface 71, 73 as required and for routing user data and control packets to the interfaces 71, 73.

An operating system 77 is responsible for the overall operational tasks performed by the UE 9 and links a number of applications and services 79 to the data layer interface 75. One of the applications within the applications and services 79 is a telephony application 81 which is compatible with VoLTE and VoWiFi.

In normal operation, the telephony application 61 is configured to connect to the MMTel service 15 provided in the IMS 7 to provide voice services via VoLTE and VoWiFi. The UE 9 registers for VoWiFi when it is connected to a WLAN 19 and the UE 9 registers for VoLTE when it is connected to the LTE cellular network 3.

Within the operating system 77, the UE also has a receiver 83 for receiving instructions from the hub regarding VoWiFi connectivity and the UE also has a VoLTE/VoWiFi switch control 85 for moving the telephony service from VoLTE from VoWiFi and from VoWiFi to VoLTE.

In the first embodiment, each VoWiFi capable UE 9 will switch from VoLTE to VoWiFi and from VoWiFi to VoLTE in accordance with the handover instructions sent by the VoWiFi monitor 39. In particular, when the hub 17 instructs a UE 9 to handover from VoWiFi to VoLTE because the ePDG for that UE is down, the UE 9 will disable its VoWiFi service and enable VoLTE. However the UE 9 will maintain the WLAN connection so that other data services continue to travel via the WLAN interface and only the VoLTE service uses the LTE cellular connection.

Although there may be a battery penalty from enabling two wireless data connections simultaneously, the benefit is that only the VoLTE service is using LTE and therefore there is no disruption caused by a switch of network adaptor to other data services that may be active on the UE. Furthermore, most cellular subscribers to an MNO have data usage limits on the LTE service and therefore a transparent switch of all data services to LTE when the user believes they are on a WLAN (which is generally unmetered) would be a negative user experience.

Another benefit of maintaining the WLAN connection is that when the hub is informed that data connectivity to the ePDG has been restored, it can use the WLAN connection to send the instructions to connect back to VoWiFi.

When the UE receives such an instruction, it will handover to VoWiFi and disable the LTE interface to save power.

In the first embodiment the VoWiFi service monitor monitors the logical data path to the ePDG of a MNO as an indication of whether VoWiFi service is possible for subscribers of the MNO network. Due to the standard configuration of UEs in preferring WLAN connectivity over LTE cellular connectivity, if the VoWiFi service is unavailable the UEs will not automatically switch to VoLTE while a WLAN connection is available between the UE and a hub. When a change in the status of an ePDG is detected, the VoWiFi service monitor informs any connected hubs. The hubs receive notifications from the VoWiFi service monitor and for each notification determine whether the ePDG status change affects one or more of the VoWiFi capable UEs connected to the hub. If at least one such device is affected by the change, the hub notifies the affected UE with instructions to handover from VoWiFi to VoLTE. In this way the UEs are less likely to miss incoming voice calls due to a failure in the VoWiFi service.

ALTERNATIVES AND MODIFICATIONS

In the embodiment, a centralized VoWiFi service monitor performs the checks on the availability of the ePDGs and then informs hubs when there is a change to any of the monitored ePDGs. In a modification, the hubs are configured to tell the VoWiFi service monitor which ePDGs are being used by their connected devices so that the VoWiFi service monitor filters the set of monitored ePDGs and only notifies a hub when one of the relevant ePDGs has changed. This increases the complexity of the VoWiFi service monitor because it must maintain a more complex profile for each registered hub. However each hub is simpler because it will only hear about ePDG statuses which are in use by connected VoWiFi devices.

In the embodiment, the VoWiFi service monitor is a centralized function for monitoring the status of various ePDGs. Hubs register with the VoWiFi service monitor for status updates. This arrangement allows for collation of information on the overall network of MNOS. In an alternative, the VoWiFi service monitor is not present but the functionality of the monitor is present in each hub, i.e. each hub is configured to ping the ePDGs associated with connected VoWiFi UEs to determine whether the VoWiFi service is available. Any affected UEs are notified and instructed to handover.

This alternative saves registration routines with an external device and furthermore provides a more accurate assessment of the status of the logical data link between the UE and the ePDG since the data packets are more likely to travel along similar paths as the real VoWiFi packets. For example if there is a problem at the ISP section of the data link, the link monitor located at the hub would detect the problem, even though it is not possible to determine the cause, and instruct VoWiFi capable UEs to handover to VoLTE. However, there will increased network traffic and processing load on the ePDGs due to the increase in the number of hubs sending ping packets to the ePDGs.

The invention claimed is:

1. A method of operating a wireless access point to manage access of at least one mobile device to a voice service located in a cellular network, the voice service being accessible via a base station of the cellular network and also via a gateway server located at a boundary between the cellular network and a public wide area network, the wireless access point having a wireless network interface for communication with the at least one mobile device via a wireless local area network link, and a wide area network interface for communication with the public wide area network, and the at least one mobile device having a cellular network interface and a wireless network interface, wherein the at least one mobile device is configured to connect to the voice service via a first path from the at least one mobile device to the voice service via the base station and the cellular network, and a second path from the at least one mobile device via the wireless access point, the public wide area network, the gateway server and the cellular network, the method comprising:
   monitoring whether the at least one mobile device is currently connected to the voice service via the second path;
   processing presence information relating to an accessibility of the gateway server via the public wide area network; and
   instructing the at least one mobile device to connect to the voice service via the first path in response to determining that:
      the at least one mobile device is connected to the voice service via the second path, and
      the gateway server is not accessible via the public wide area network.

2. A method according to claim 1, wherein the at least one mobile device is configured to access the voice service via the second path using Voice over Wi-Fi (VoWiFi), and to access the voice service via the first path using Voice over LTE (VoLTE), wherein the at least one mobile device is instructed to perform a handover process from VoWiFi to VoLTE.

3. A method according to claim 1, further comprising:
   processing further presence information; and
   if the gateway server is determined to be accessible, instructing the at least one mobile device to connect to the voice service via the second path.

4. A method according to claim 1, further comprising generating the presence information by attempting to connect to the gateway server.

5. A method according to claim 1, further comprising receiving the presence information from a gateway presence monitor located in the public wide area network.

6. A method according to claim 1, wherein a plurality of mobile devices are connected to the wireless access point via the wireless local area network link, and at least one of the plurality of mobile devices are associated with a second cellular network, the second cellular network having a respective second gateway server for access to a second voice service associated with the second cellular network via the public wide area network, the method further comprising:
   storing, in a data store, an association between each of the plurality of mobile devices and its respective gateway server;
   processing gateway server presence information relating to the accessibility of each gateway server; and
   in the event of detecting that at least one of the gateway servers is unavailable:
      identifying any mobile devices which are subscribers of the cellular network corresponding to the unavailable gateway server; and
      instructing any identified mobile devices to connect to the voice service via a respective first path.

7. A non-transitory computer-readable storage medium storing a computer program containing processor executable instructions for causing a processor to carry out the method of claim 1.

8. A wireless access point for managing access of at least one mobile device to a voice service located in a cellular network, the voice service being accessible via a base station of the cellular network and also via a gateway server located at a boundary between the cellular network and a public wide area network, the at least one mobile device having a cellular network interface and a wireless network interface, wherein the at least one mobile device is configured to connect to the voice service via a first path from the at least one mobile device to the voice service via the base station and the cellular network, and a second path from the mobile device via the wireless access point, the public wide area network, the gateway server and the cellular network, the wireless access point comprising:
   a wireless network interface for communication with the at least one mobile device;
   a wide area network interface for communication with the public wide area network;
   at least one processor for monitoring whether the at least one mobile device is currently connected to the voice service via the second path and processing presence information relating to an accessibility of the gateway server via the public wide area network; and
   a controller for instructing the at least one mobile device to connect to the voice service via the first path in response to determining that the at least one mobile device is connected to the voice service via the second path and the gateway server is not accessible via the public wide area network.

9. A wireless access point according to claim 8, wherein the at least one mobile device is configured to access the voice service via the second path using Voice over Wi-Fi (VoWiFi), and to access the voice service via the first path using Voice over LTE (VoLTE), wherein the at least one mobile device is instructed to perform a handover process from VoWiFi to VoLTE.

10. A wireless access point according to claim 8, wherein the at least one processor is configured to periodically process further presence information; and the controller is configured to instruct the at least one mobile device to reconnect to the voice service via the second path, in the event that the gateway server is determined to be accessible.

11. A wireless access point according to claim 8, wherein the at least one processor is further configured to generate the presence information by attempting to connect to the gateway server via the public wide area network.

12. A wireless access point according to claim 8, further comprising a receiver for receiving the presence information from a gateway presence monitor located in the public wide area network.

13. A wireless access point according to claim 8, wherein a plurality of mobile devices are connected to the wireless access point via the wireless local area network link, and at least one of the plurality of mobile devices are associated with a second cellular network, the second cellular network having a respective second gateway server for access to a second voice service associated with the second cellular network via the public wide area network, the wireless access point further comprising:
   a data store storing an association between each of the plurality of mobile devices and its respective gateway server; and wherein:
the at least one processor is configured to process gateway server presence information relating to the accessibility of each gateway server; and
the controller, in the event of detecting that at least one of the gateway servers is unavailable, is operable to:
identify any mobile devices which are subscribers of the cellular network corresponding to the unavailable gateway server; and
instruct any identified mobile devices to connect to the voice service via a respective first path.

14. A method of managing access by a mobile device to a voice service located on a cellular network, the mobile device having a cellular network interface for accessing the cellular network via a radio access network and a wireless local area network interface for connecting to a wireless access point forming a wireless local area network, the wireless access point having a wide area network interface for accessing a public wide area network and a cellular gateway server located at a boundary between the public wide area network and the cellular network, the method comprising:
at a gateway presence monitor located in the wide area network:
accessing a first data store containing an identifier of the cellular gateway server and a wide area network address of the cellular gateway server;
determining an availability of the cellular gateway server via the public wide area network;
updating the first data store with the determined availability of the cellular gateway server; and
sending at least a part of a content of the updated first data store relating to the cellular gateway server availability to the wireless access point; and
at the wireless access point:
receiving an update from the gateway presence monitor relating to the cellular gateway server availability;
accessing a second data store storing an identifier for the mobile device, a wide area network address of the associated cellular gateway server and an availability status of the cellular gateway server; and
if the update from the gateway presence monitor indicates that the cellular gateway server is not currently available via the public wide area network, notifying the mobile device to access the voice service via the cellular network.

15. A system for managing access to a voice service by at least one mobile device, comprising:
a cellular network for providing connectivity to the at least one mobile device, the cellular network having:
a radio access network for communication with the at least one mobile device;
a network core for routing data packets of the at least one mobile device;
a cellular gateway located at a boundary of the cellular network and a public wide area network for access to the cellular network via alternate networks;
a wireless access point having a wireless local area network connected to the at least one mobile device and further connected to the public wide area network; and
a voice service associated with the cellular network and accessible via the cellular network and the public wide area network,
wherein:
the at least one mobile device is connected to the voice service via the wireless access point, the public wide area network and the cellular gateway; and
the wireless access point is operable to:
receive an update from a gateway presence server relating to cellular gateway availability;
access a data store storing an identifier for the at least one mobile device, a wide area network address of the associated cellular gateway and an availability status of the cellular gateway; and
if the update from the gateway presence server indicates that the cellular gateway is not currently available via the public wide area network, notify the at least one mobile device to access the voice service via the cellular network.

* * * * *